United States Patent [19]

Rinker et al.

[11] 4,253,898

[45] Mar. 3, 1981

[54] BONDING COMPOSITION AND MICROWAVE PROCESS FOR BONDING TOGETHER PLASTIC COMPONENTS

[75] Inventors: William R. Rinker, Cuyahoga Falls; Richard S. Varga, Akron, both of Ohio

[73] Assignee: The B. F. Goodrich Company, Akron, Ohio

[21] Appl. No.: 92,011

[22] Filed: Dec. 17, 1979

[51] Int. Cl.$^3$ .............................................. B29C 19/02
[52] U.S. Cl. ..................... 156/272; 156/273; 156/333; 204/159.2; 428/520
[58] Field of Search ............ 156/272, 333, 273; 428/520; 427/45.1; 204/159.2; 260/31.8 R; 219/10.55 M

[56] References Cited

U.S. PATENT DOCUMENTS

| | | | |
|---|---|---|---|
| 2,859,153 | 11/1958 | Zucht | 156/273 |
| 3,164,508 | 1/1965 | Marcey | 156/273 |
| 3,186,889 | 6/1965 | Boldrini et al. | 156/333 |
| 3,519,517 | 7/1970 | Hecht | 219/10.55 M |
| 3,551,199 | 12/1970 | Forster | 427/45.1 |
| 3,644,161 | 2/1972 | Hall | 156/272 |
| 3,762,979 | 10/1973 | Hanel et al. | 156/333 |
| 3,967,999 | 7/1976 | Sommerfeld et al. | 156/273 |
| 4,188,769 | 2/1980 | Bright | 156/272 |

FOREIGN PATENT DOCUMENTS

798816  11/1968  Canada ...................................... 156/273

*Primary Examiner*—John J. Gallagher
*Attorney, Agent, or Firm*—James R. Lindsay

[57] ABSTRACT

A bonding composition comprised of a plastisol and from 10 to 100 parts by weight per 100 parts by weight of vinyl polymer resin in the plastisol of a polar material having a dielectric constant above 35 at 20° C. is used for bonding together plastic components, such as vinyl polymer components. The bonding composition is interposed between and in contact with the plastic components which are to be bonded together. Then, the composite structure is exposed to electromagnetic energy having a wave length between about 0.001 to 0.3 meter for about ¼ minute to 5 minutes. The electromagnetic energy heats the bonding composition to a temperature at which fusion of the bonding composition occurs and to a temperature sufficient to cause melting of the surfaces of the plastic components in contact with the bonding composition. Upon cooling the composite structure, a strong bond between the components has occurred.

3 Claims, 1 Drawing Figure

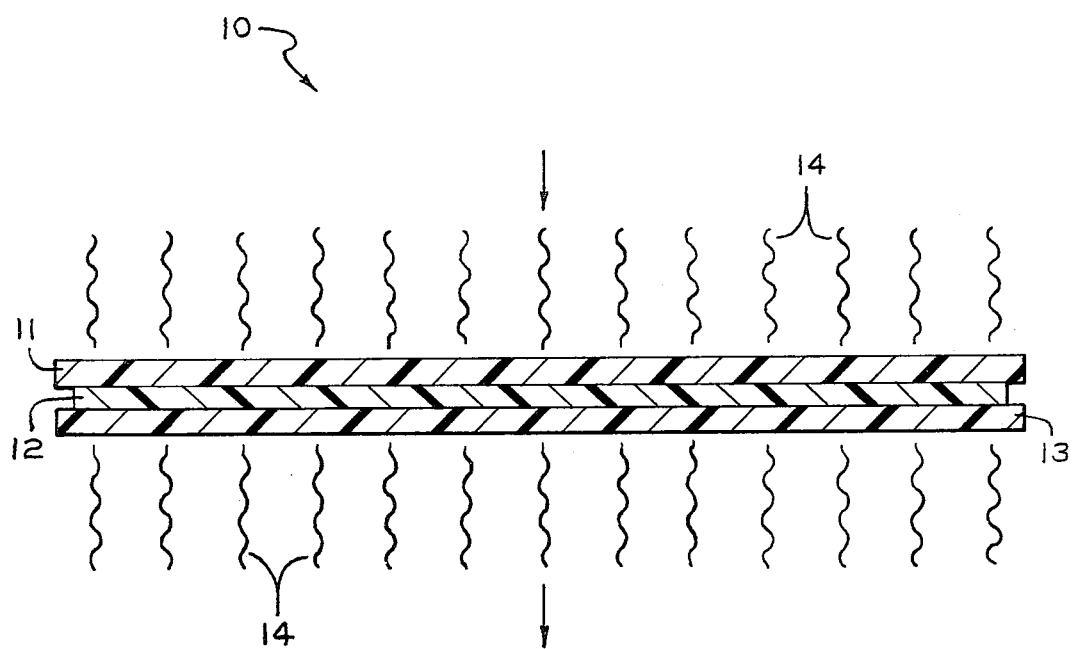

BONDING COMPOSITION AND MICROWAVE PROCESS FOR BONDING TOGETHER PLASTIC COMPONENTS

BACKGROUND OF THE INVENTION

In the fabrication of composite structures made up of two or more plastic components, solvent bonding has been used for producing a strong bond between the components. To achieve the bond a volatile "solvent" for the plastic from which the components to be joined together are made is applied to the interfacing surfaces of the plastic components. The "solvent" softens the interfacing surfaces which surfaces then are held in contact with each other until the "solvent" evaporates. Fusion of the contacting interfacing surfaces occurs upon the evaporation of the "solvent" from the surfaces. Heat may be applied to the structure to accelerate the process of evaporation.

Typical "solvents" which have been used for solvent bonding are tetrahydrofuran, methyl ethyl ketone and acetone. However, many of the "solvents" which are useful for solvent bonding are believed to be hazardous to the health of persons who are exposed over prolonged periods of time to the solvent. As a consequence, it has been suggested that worker's exposure to those solvents believed to be hazardous be limited or even eliminated.

SUMMARY OF THE INVENTION

The present invention provides a bonding composition that need not contain a hazardous solvent component but which can form a strong bond between plastic components of a composite structure. The bonding composition can be used for bonding together any plastic components which will heat-fuse to a vinyl chloride polymer. Examples of plastic materials that can be bonded together using the bonding composition of the present invention are vinyl chloride and vinylidene chloride polymer compositions, including homopolymer compositions, copolymer compositions and compositions comprising blends of homopolymers and/or copolymers, and ABS plastics. The bonding composition is comprised of a plastisol and from 10 to 100 parts by weight per 100 parts by weight of vinyl polymer in the plastisol of a polar material having a dielectric constant above about 35 at 20° C. The bonding composition is interposed between and in contact with the plastic components desired to be bonded together. Electromagnetic energy having a wave length between about 0.001 to 0.3 meter is directed through the composite for about ¼ minute to 5 minutes. The time will vary depending on the mass to be heated and the intensity of the electromagnetic energy used. The electromagnetic energy heats the bonding composition (through excitation of the molecules of the polar component of the bonding composition) to a temperature sufficient to cause fusion of the bonding composition and sufficient to produce melting of the surfaces of the plastic components in contact with the bonding composition. When the flow of the electromagnetic energy through the composite structure is terminated and the structure is allowed to cool below the softening temperature of the fused bonding composition and the plastic components of the structure, a unitary structure results.

THE DRAWING

The single FIGURE of the drawing is an elevation view of a composite structure being subjected to electromagnetic energy in accordance with this invention.

DETAILED DESCRIPTION OF THE INVENTION

The single FIGURE of the drawing illustrates the process for bonding two or more plastic components together. In accordance with the invention, the composite structure 10 (comprised of a first plastic component 11, a layer of bonding material 12 and a second plastic component 13) is formed by interposing the layer 12 of bonding composition between the two plastic components 11 and 12 to be bonded together. The composite 10 then is exposed to electromagnetic energy 14 for a period of time sufficient to cause the layer 12 of bonding composition to be heated to a temperature at which the bonding composition "fuses" and to cause a softening of the surfaces of the plastic components 11 and 12 that are in contact with the layer 12 of bonding composition. The passing of the electromagnetic force through the composite structure then is discontinued. The structure 10 is allowed to cool to a temperature below the softening temperature of the fused bonding composition of layer 12 and the softening temperature of the respective plastic components 11 and 13.

The bonding composition utilized to form layer 12 is a plastisol composition containing from 10 to 100 parts by weight per 100 parts by weight of vinyl polymer in the plastisol of a polar material having a dielectric constant above about 35 at 20° C.

A plastisol composition is a colloidal dispersion of a vinyl polymer resin in a liquid plasticizer for the vinyl polymer resin. The vinyl polymer resin may be any vinyl polymer resin that will form a colloidal dispersion when mixed with a liquid plasticizer for the vinyl polymer resin. Such vinyl polymer resins include homopolymers of vinyl chloride, homopolymers of vinylidene chloride, copolymers of vinyl chloride, copolymers of vinylidene chloride, and blends of such homopolymers and/or copolymers. The vinyl polymer resins may include from 0 to about 50% by weight of at least one other olefinically unsaturated monomer, more preferably from 0 to about 50% by weight of at least one other vinylidene monomer (i.e., a monomer containing at least one terminal $CH_2=C<$ group per molecule) copolymerized therewith, even more preferably from 0 to 20% by weight of such vinylidene monomer. Suitable monomers include 1-olefins containing from 2 to 12 carbon atoms, such as ethylene, propylene, 1-butene, isobutylene, 1-hexene, 4-methyl-1-pentene, and the like; dienes containing from 4 to 10 carbon atoms including conjugated dienes such as butadiene, isoprene, piperylene, and the like; ethylidene norbornene and dicyclopentadiene; vinyl esters and allyl esters such as vinyl acetate, vinyl chloroacetate, vinyl propionate, vinyl laurate, allyl acetate, and the like; vinyl aromatics such as styrene, $\gamma$-methyl styrene, chlorostyrene, vinyl toluene, vinyl naphthalene, and the like; vinyl and allyl ethers and ketones such as vinyl methyl ether, allyl methyl ether, vinyl isobutyl ether, vinyl n-butyl ether, vinyl chloroethyl ether, methyl vinyl ketone, and the like; vinyl nitriles such as acrylonitrile, methacrylonitrile, and the like; cyanoalkyl acrylates such as $\gamma$-cyanomethyl acrylate, the $\gamma$-,$\beta$ and $\gamma$-cyanopropyl acrylates, and the like; olefinically unsaturated carboxylic acids and esters thereof, including γ,β-olefinically unsaturated acids and esters thereof such as methyl acrylate, ethyl acrylate, chloropropyl acrylate, butyl acrylate, hexyl acrylate, 2-ethylhexyl acrylate, dodecyl acrylate, octadecyl acrylate, cyclohexyl acrylate, phenyl acrylate, glycidyl acrylate, methoxyethyl acrylate, ethoxyethyl acrylate, hexylthioethyl acrylate, methyl methacrylate, ethyl methacrylate, butyl methacrylate, glycidyl methacrylate, and the like; and including esters of maleic and fumaric acid, and the like; amides of the γ,β-olefinically unsaturated carboxylic acids such as acrylamide, and the like; divinyls, diacrylates and other polyfunctional monomers such as divinyl benzene, divinyl ether, diethylene glycol diacrylate, ethylene glycol dimethacrylate, methylene-bis-acrylamide, allyl pentaerythritol, and the like; and bis (β-haloalkyl) alkenyl phosphonates such as bis (β-chloroethyl) vinyl phosphonate, and the like. The vinyl polymer dispersion resins used in plastisol compositions usually have an inherent viscosity (when measured in accordance with the procedure described in ASTM D 1243-66) of from about 0.6 to 1.40 and a relatively small average particle size diameter of about from 0.2 to 50.0 microns, although up to about 45% by weight of the vinyl polymer resin in the plastisol may be a vinyl polymer resin having a larger average particle size diameter between about 50.0 to 400 microns.

The plasticizer in the plastisol composition provides fluidity to the composition. Any liquid plasticizer for the vinyl polymer resin present in the plastisol may be used in forming the plastisol. Most plasticizers utilized in the formation of plastisols are esters of long-chain alcohols with aromatics such as phthalic anhydride, with straight-chain dibasic acids such as sebacic or adipic acid, or polyesters such as those based on propylene glycol and sebacic acid. Phthalate esters (for example, di-2-ethyl-hexyl phthalate, diisoctyl phthalate, diisodecyl phthalate, dihexyl phthalate, di-n-octyl phthalate, dibutyl phthalate, di-2-ethylhexyl isophthalate and di-2-ethylhexyl terephthalate) are used more frequently than other type plasticizers in plastisol compositions. Phosphate esters (for example, tricresyl phosphate, tri-2-ethylhexyl phosphate, cresyl diphenyl phosphate and octyl diphenyl phosphate) contribute a degree of flame resistance through increased char formation during combustion. Examples of alcohol esters of straight-chain dibasic acids are dioctyl adipate, dibutyl sebacate and dioctyl sebacate. A blend of two or more plasticizers to impart desired physical properties to the plastisol composition may be used. The amount of plasticizer used in the plastisol composition contributes significantly to the consistency of the plastisol composition. Desirably, the plastisol bonding composition contains from about 25 to 200 parts by weight of the plasticizer for every 100 parts by weight of vinyl polymer resin in the plastisol composition.

The polar component of the plastisol composition may be any polar material that has a dielectric constant above about 35 at 20° C. Such polar materials include tetrahydrothiophene-1,1-dioxide, maleic anhydride, 3,5,5-trimethyl-2-cyclohexene-1-one, acetamide, formamide, glycerol, furfural, glycolonitrile, malonic mononitrile, sulfanilamide, para-trimethyl sulfonylic acid and water. The amount of polar material present in the plastisol composition can vary over a wide range. In general, the greater the quantity of polar material used in the plastisol bonding composition, the less time it need be exposed to the electromagnetic energy to obtain the desired bond. However, the use of larger amounts of certain of the polar materials can adversely affect one or more physical properties of the fused bonding layer 12. Desirably, the plastisol bonding composition contains from about 10 to 100 parts by weight of the polar material per 100 parts by weight of vinyl polymer resin in the composition.

In addition to the vinyl polymer resin, plasticizer and polar component in the plastisol bonding composition used to form layer 12 of the structure 10, the plastisol composition may contain one or more other materials often added to plastisols such as heat stabilizers, light stabilizers, extenders, colorants, fillers, etc. The plastisol composition is prepared in the usual manner using customary mixing equipment.

In bonding two plastic components together, the plastisol bonding composition is interposed between the surfaces of the plastic components to be bonded together. A coating of the plastisol bonding composition can be applied to only one of the surfaces of the plastic components to be joined or, if desired, a coating of the plastisol bonding composition can be applied to both opposing surfaces of the plastic components to be joined. The plastic components to be joined then are brought together with the layer of plastisol bonding composition interposed between and in contact with the surfaces to be bonded together. The resulting composite structure is placed in a field of electromagnetic energy having a wave length between about 0.001 to 0.3 meter for about ¼ minute to about 5 minutes. As the electromagnetic energy passes through the plastisol bonding layer of the composite structure, the molecules of the polar material in the plastisol bonding composition are "excited" by the electromagnetic energy and the molecule movement generates sufficient heat to cause the plastisol composition to fuse and to cause the surfaces of the plastic components that are in physical contact with the plastisol bonding composition to soften. When the flow of electromagnetic energy through the composite structure is stopped and the structure is allowed to cool below the softening temperature of the plastic components and the fused plastisol bonding composition, a strong bond between the plastic components is obtained.

The following examples illustrate the invention more fully.

EXAMPLE I

Two rigid polyvinyl chloride sheets about 20 mils thick were bonded together in the following manner. A plastisol bonding composition was formed that had the following formulation:

| Material | Parts by Weight |
| --- | --- |
| Vinyl chloride polymer[1] (GEON 13 × 24 resin) | 100.0 |
| Dioctyl adipate | 23.0 |
| Trimethylolpropane tri-methacrylate | 17.0 |
| Polar material (97% by wt. tetrahydrothiophene-1,1-dioxide and 3% by wt. water) | 20.0 |
| Tertiary butyl perbenzoate | 0.7 |

[1] A vinyl chloride-vinyl acetate copolymer containing about 8% by weight vinyl acetate and having an inherent viscosity (measured pursuant to ASTM D 1243-66) of 1.10, a specific gravity of about 1.39 and a fusion temperature of about 275° F.

A layer of the plastisol bonding composition was applied to the surface of one of the polyvinyl chloride sheets desired to be bonded together. The second polyvinyl chloride sheet was combined with the first polyvinyl chloride sheet with the layer of plastisol bonding composition interposed between and in contact with the opposing surfaces of the polyvinyl chloride sheets. The composite was placed in a microwave oven and electromagnetic energy having a wave length of about 0.12 meter was passed through the composite for 3 minutes. The composite thereafter was allowed to cool to a temperature below the softening temperature of the polyvinyl chloride sheets and the fused plastisol bonding composition and was removed from the oven. After being allowed to cool to room temperature (about 25° C.), the bond between the two polyvinyl chloride sheets was so strong that they could not be separated by a "hand pull".

EXAMPLE II

Two rigid polyvinyl chloride sheets about 20 mils thick were bonded together in the following manner. A plastisol bonding composition was formed that had the following formulation:

| Material | Parts by Weight |
| --- | --- |
| Vinyl chloride polymer[1] (GEON 130 × 17 resin) | 10.0 |
| Trimethylolpropane trimethacrylate | 10.0 |
| Polar Material (97% by wt. tetrahydrothiophene-1,1-dioxide and 3% by wt. water) | 10.0 |
| Tertiary butyl perbenzoate | 0.17 |
| Dibutyltin dilaurate (stabilizer) | .05 |

[1]A carboxy-modified vinyl chloride polymer having an inherent viscosity (measured pursuant to ASTM D 1243-66) of 1.40, a specific gravity of about 1.39 and a fusion temperature of about 270° F.

The plastisol bonding composition was spread onto the surfaces of the polyvinyl chloride sheets to be bonded together and the sheets were pressed together with the plastisol bonding composition sandwiched between and in contact with the surfaces to be bonded. The composite was placed in a microwave oven and exposed to electromagnetic energy having a wave length of about 0.12 meter for about 2 minutes. The composite thereafter was allowed to cool to room temperature (about 25° C.). The two sheets withstood efforts to "hand pull" them apart.

EXAMPLE III

Two rigid polyvinyl chloride sheets about 20 mils thick were bonded together in the following manner. A plastisol bonding composition was formed that had the following formulation:

| Material | Parts by Weight |
| --- | --- |
| Vinyl chloride polymer[1] (GEON 130 × 24 resin) | 15.0 |
| Vinyl chloride polymer[2] (GEON 130 × 17 resin) | 5.0 |
| Trimethylolpropane trimethacrylate | 7.0 |
| Dibutyltin dilaurate (stabilizer) | 0.5 |
| Tertiary butyl perbenzoate | 0.17 |
| Glycerin | 2.0 |
| Dioctyl adipate | 4.0 |
| Polar material (tetrahydrothiophene-1,1-dioxide) | 5.0 |

[1]A vinyl chloride-vinyl acetate copolymer containing about 8% by weight vinyl acetate and having an inherent viscosity (measured pursuant to ASTM D 1243-66) of 1.10, a specific gravity of about 1.39 and a fusion temperature of about 275° F.
[2]A carboxy-modified vinyl chloride polymer having an inherent viscosity (measured pursuant to ASTM D 1243-66) of 1.40, a specific gravity of about 1.39 and a fusion temperature of about 270° F.

A layer of the plastisol bonding composition was applied to the surface of one of the polyvinyl chloride sheets to be bonded together. The second polyvinyl chloride sheet was combined with the first polyvinyl chloride sheet with the layer of plastisol bonding composition interposed between and in contact with the opposing surfaces of the polyvinyl chloride sheets. The composite was placed in a microwave oven and electromagnetic energy having a wave length of about 0.12 meter was passed through the composite for 2 minutes. The composite was allowed to cool to room temperature (about 25° C.). The two polyvinyl chloride sheets were so strongly bonded together that they could not be separated by "hand pull".

We claim:

1. The process for bonding together vinyl chloride or vinylidene chloride polymer components which comprises interposing between the said vinyl polymer components to be bonded together and in contact with opposing surfaces of the said vinyl polymer components a bonding composition comprising (a) a colloidal dispersion of a vinyl chloride polymer resin or a vinylidene chloride polymer resin or a mixture of vinyl chloride and vinylidene polymer resins having at least 50 percent by weight of vinyl chloride or vinylidene chloride in from about 25 to 200 parts by weight per 100 parts by weight of said vinyl polymer of a liquid plasticizer for said vinyl polymer and (b) from 10 to 100 parts by weight per 100 parts by weight of said vinyl polymer of a polar material having a dielectric constant above 35 at 20° C., subjecting said vinyl polymer components to be bonded together with said bonding composition interposed between and in contact with said vinyl polymer components to electromagnetic energy having a wave length between about 0.001 to 0.3 meter for about ¼ minute to about 5 minutes to heat the said bonding composition to a temperature at which fusion of the colloidal dispersion occurs and at which the surfaces of the said vinyl polymer components in contact with the bonding composition softens, and cooling the resulting structure to a temperature below the softening temperature of the fused bonding composition and the said plastic components.

2. The process of claim 1 in which the polar material in the bonding composition includes tetrahydrothiophene-1,1-dioxide.

3. The process of claim 2 in which the polar material comprises about 97 percent by weight of tetrahydrothiophene-1,1-dioxide and about 3 percent by weight of water.

* * * * *